United States Patent
Cheng et al.

(10) Patent No.: US 10,201,874 B2
(45) Date of Patent: Feb. 12, 2019

(54) METHOD AND APPARATUS FOR REALIZING TUBULAR OPTICAL WAVEGUIDES IN GLASS BY FEMTOSECOND LASER DIRECT WRITING

(71) Applicant: Shanghai Institute of Optics And Fine Mechanics, Chinese Academy of Sciences, Shanghai (CN)

(72) Inventors: Ya Cheng, Shanghai (CN); Yang Liao, Shanghai (CN); Wei Chu, Shanghai (CN); Peng Wang, Shanghai (CN); Jia Qi, Shanghai (CN)

(73) Assignee: Shanghai Institute of Optics And Fine Mechanics, Chinese Academy of Sciences, Shanghai (CN)

(*) Notice: Subject to any disclaimer, the term of this patent is extended or adjusted under 35 U.S.C. 154(b) by 190 days.

(21) Appl. No.: 15/096,066

(22) Filed: Apr. 11, 2016

(65) Prior Publication Data
US 2017/0216967 A1    Aug. 3, 2017

(30) Foreign Application Priority Data

Jan. 28, 2016   (CN) .......................... 2016 1 0058876

(51) Int. Cl.
| | | |
|---|---|---|
| *B23K 26/0622* | (2014.01) | |
| *B23K 26/53* | (2014.01) | |
| *B23K 26/06* | (2014.01) | |
| *B23K 26/00* | (2014.01) | |
| *G02B 6/13* | (2006.01) | |
| *C03C 23/00* | (2006.01) | |
| *G02B 6/00* | (2006.01) | |
| *B23K 103/00* | (2006.01) | |

(52) U.S. Cl.
CPC ...... *B23K 26/0624* (2015.10); *B23K 26/0006* (2013.01); *B23K 26/0643* (2013.01); *B23K 26/0648* (2013.01); *B23K 26/53* (2015.10); *C03C 23/0025* (2013.01); *G02B 6/00* (2013.01); *G02B 6/13* (2013.01); *B23K 2103/54* (2018.08)

(58) Field of Classification Search
CPC .............. B23K 26/0624; B23K 26/53; B23K 26/0006; B23K 26/0057; B23K 26/0643; B23K 26/0648; B23K 2203/54; C03C 23/0025; G02B 6/13
See application file for complete search history.

(56) References Cited

U.S. PATENT DOCUMENTS

| | | | | |
|---|---|---|---|---|
| 6,950,591 | B2 * | 9/2005 | Schroeder | C03C 23/0025 385/129 |
| 6,977,137 | B2 * | 12/2005 | Borrelli | C03C 23/0025 430/321 |
| 2010/0270277 | A1 * | 10/2010 | Matsumoto | B23K 26/0084 219/121.72 |

* cited by examiner

*Primary Examiner* — Queenie S Dehghan
(74) *Attorney, Agent, or Firm* — Mei & Mark LLP; Manni Li

(57) ABSTRACT

Apparatus and method for realizing tubular optical waveguides in glass by femtosecond laser direct writing. Irradiation in glass with focused femtosecond laser pulses leads to decrease of refractive index in the modified region. Tubular optical waveguides of variable mode areas are fabricated by forming the four sides of the modified regions with slit-shaped femtosecond laser pulses, ensuring single mode waveguide with a mode field dimension compatible with direct coupling to single-mode optical fibers.

3 Claims, 1 Drawing Sheet

METHOD AND APPARATUS FOR REALIZING TUBULAR OPTICAL WAVEGUIDES IN GLASS BY FEMTOSECOND LASER DIRECT WRITING

CROSS-REFERENCE AND RELATED APPLICATION

The subject application claims priority on Chinese patent application 201610058876.0 filed on Jan. 28, 2016. The contents and subject matters of the Chinese priority application is incorporated herein by reference.

FIELD OF INVENTION

The present invention generally relates to an apparatus and a method for realizing tubular optical waveguides in glass by femtosecond laser direct writing.

DESCRIPTION OF RELATED ART

Femtosecond laser micro-machining has opened up a new avenue in materials processing due to its unique characteristics of ultra short pulse width and extremely high peak intensity. It provides a new approach to fabricate complicate and large scale 3-dimensional micro structures in transparent materials. The femtosecond laser pulses may change the property of the materials in the processed region by nonlinear optical processes, which may be used in high-quality micro- and nano fabrication of a variety of materials. After the irradiation of ultrafast laser pulses, the material undergoes a localized permanent change in the refractive index, which enables the fabrication of optical waveguides, beam splitter and coupler, multimode interferometer, and other photonic devices in the transparent materials. Due to the advantages such as simple fabrication process, high integration, easy to test, and excellent performance, femtosecond laser micro-machining becomes a promising tool in integrated optics, information optics, and quantum optics.

Currently, two approaches are used to form the optical waveguide by femtosecond laser micro machining. In many glasses such as fused silica and borosilicate glasses, waveguides written by focused femtosecond laser beams consist of cores with increased refractive index that overlap the center of focal spots. Femtosecond laser may induce negative refractive index change in several kinds of glass and crystals, such as ZBLAN glass and lithium niobate; in these materials, waveguides are generally produced by forming a cladding region of reduced refractive index by irradiation of femtosecond laser pulses. The waveguides fabricated in such a way are usually termed "tubular waveguides" as the cladding appears like a tube which surrounds the waveguiding area unaffected by the laser irradiation. The latter approach has gained great attention due to the potential of fabricating large scale optical waveguide. However, in the scheme, the formation of claddings requires a considerable number of scan, and the formed claddings tend to be thick and may cause considerable difficulty in enhancing the waveguide coupling efficiency. These drawbacks prohibit the waveguides based on such technology to fabricate micro-nano photonic device.

Alternatively, the tubular waveguides may also be longitudinally formed with the spatial modulated femtosecond laser beam, which allows formation of tubular waveguides with small mode areas and thin cladding layers provided that a tight focusing condition is chosen by use of high-numerical-aperture (high-NA) focal lenses. However, the scheme inherently suffers from lack of flexibility in terms of writing 3D photonic circuits due to the limited working distances of high-NA lenses.

SUMMARY OF THE INVENTION

The present invention provides an apparatus and a method for realizing tubular optical waveguides in glass by femtosecond laser direct write. It is efficient and easy to operate. The tubular optical waveguides fabricated by the method of the present invention has controllable mode area and low loss characteristics.

The apparatus for realizing tubular optical waveguides in glass by means of a femtosecond laser direct write of the present invention comprises a femtosecond laser system, an attenuator, a shutter, a spatial light modulator (SLM), a first reflector, a first convex lens, a slit, a second reflector, a second convex lens, a dichroic mirror, an objective lens, transparent glass material, a computer-controlled XYZ platform, computer, cold light source, a third reflector, and a CCD.

In the present invention, the pulse energy of the output beam of the femtosecond laser system may be controlled by the attenuator. Along the direction of the laser pulse emitted by the femtosecond laser system, the attenuator, the shutter, and the spatial light modulator (SLM) are arranged along the optic pathway, and the laser pulses and beam, after the reflection by the spatial light modulator, sequentially passes through the first reflector, the first convex lens, and second reflector, the second convex lens, and the dichroic mirror along the optic pathway. Then, the laser pulses are reflected by the dichroic mirror and focused by the objective lens to the inside of the transparent glass material which is fixed onto a three dimensional XYZ platform. The XYZ platform is connected to the computer. The slit is positioned at the focal plane of the first reflector, which is the Fourier imaging plane of the reflection spot from the SLM. After being reflected by the third reflector, the beam from the cold light source is reflected on the bottom of the transparent glass. After being projected by the transparent glass and focused by the objective lens, the beam is projected into the dichroic mirror. After passing through the dichroic mirror, the beam is received by the CCD and the output of the CCD is connected to the computer.

The present invention further provides a method for realizing tubular optical waveguides in glass based on the apparatus of the present invention and comprises the steps of:

(1) Designing a first phase modulation mask and writing the first phase modulation mask into the SLM;

(2) Fixing the transparent glass on the XYZ platform and focusing the femtosecond laser pulses into the transparent glass by moving the XYZ platform to fabricate enclosed claddings;

(3) setting an opposite direction of the laser as a Z axis, setting width and length direction of the transparent glass as an X and Y axes; after modulation and filtering, the femtosecond pulses are focused into the transparent glass through the objective lens to form a narrow region of reduced refractive index along the X axis with a width of D; using the position as a start point, moving the XYZ platform along the −Y direction for a distance L to form a flat and narrow region with a length of L and width of D inside the transparent glass having the refractive index is less than that of the transparent glass, and using the region as a bottom cladding of a waveguide;

(4) designing a second phase modulation mask and writing the second phase modulation mask into the SLM;

(5) tuning the attenuator to adjust power of the incoming laser pulses, moving the XYZ platform to adjust position of the transparent material, after modulation and filtering, focusing and forming the laser pulses into a narrow region along Z direction with a width of D inside the transparent glass; the region is connected to the left side of the region formed in step (3); moving the XYZ platform along the −Y direction for a distance of L to form a planar laser-modified region that is a left cladding of the waveguide;

(6) moving the XYZ platform to a second position, after modulation and filtering, focusing the laser pulses and forming a narrow region along Z direction with a width of D inside the transparent glass, and making the region to be connected to the right side of the region formed in step ③; moving the platform along the −Y direction for a distance of L to form a planar laser-modified region that is the right cladding of the waveguide; and (7) moving the XYZ platform back to the start position, designing a first mask and writing the first mask into the SLM, moving the XYZ platform for a distance D along +Z axis, tuning the attenuator to increasing power of the laser pulses and focusing the femtosecond laser pulses, after modulation and filtering, and forming a narrow region inside the transparent glass that is on the plane of the starting position and parallel to the plane of the region formed in step (3); moving the platform for a distance of L along −y direction to form a planar laser-modified region that is a top cladding of the waveguide.

The present invention are advantageous in the following areas:

The present invention involves transversely writing the tubular waveguides by focusing slit-shaped and spatial-modulated femtosecond laser beams in glass to form the claddings. The present invention writes pre-set phase grating position into the spatial light modulator to modulate the spatial phase of femtosecond laser pulses, the femtosecond laser pulses, after being modulated, show diffracted light intensity distribution in the Fourier transform plane thereof, and through the slit spatial filtering, a first degree diffraction spot is obtained on the Fourier transform plane. By the above-described femtosecond laser pulse phase modulation processing and spatial filtering, the femtosecond laser pulses go through the objective lens and are focused onto a particular transparent material. The light intensity at the focal point is more evenly and narrowly distributed. Since the interaction of the femtosecond laser and these particular materials may induce reduction of the local refractive index, then, the modulated and filtered femtosecond laser pulses may induce narrow area with decreased refractive index inside the transparent material. The transparent material is driven by the computer-controlled XYZ platform to move so that the femtosecond laser direct writes inside the transparent material to have a layered structure with reduced refractive index. Through spatial Integration and reasonable geometric construction, a plurality of such layered structure may be used as claddings to enclose a channel whose cross-section is square shaped, thus, a square ring waveguide inside the transparent material is achieved.

DETAILED DESCRIPTION OF THE INVENTION

The following description provides embodiments and is not intended to limit the scope of the present invention.

Figures 1A, 1B:
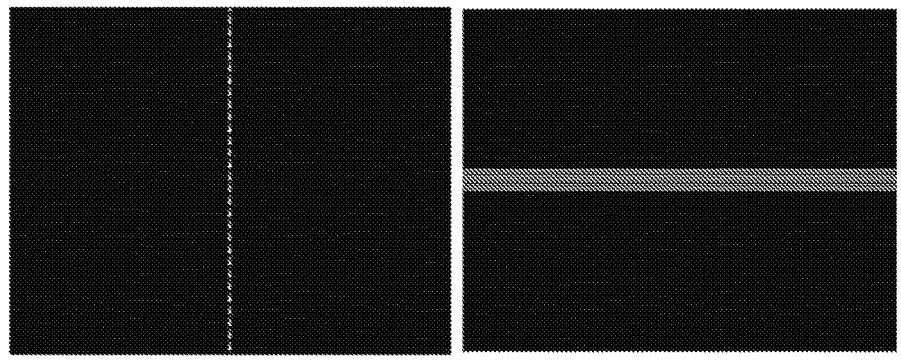
FIG. 1(a) shows mask 1 for the SLM with a central grating region, and the vertical length of the region is 12000 μm and the horizontal length of 120 μm.
FIG. 1(b) shows mask 2 for the SLM with a central grating region, and the vertical length of the region is 800 μm and the horizontal length of 16000 μm.

FIG. 1(a) shows mask image 1 for the SLM with a central rectangular grating region. The vertical length of the region is 12000 μm and the horizontal length of 120 μm. The gray value inside the grating region changes from 0 to 210 along the vertical direction with a spatial period of 420 μm, and the value outside the region is set to 0.

FIG. 1(b) shows mask image 2 for the SLM with a central rectangular grating region. The vertical length of the region is 800 μm and the horizontal length of 16000 μm. The gray value inside the grating region along the vertical direction with a spatial period of 100 μm, and the value outside the region is also set to 0. The masks modulate the phase of the femtosecond laser pulse by changing the refractive index of the liquid crystal surface of the SLM. The diffraction may be achieved on the Fourier Transform Plane of SLM, and the first order diffraction is filtered out through a slit. Set the opposite direction of the laser as the Z axis, the sides of the transparent material as the X and Y axes. After focusing by the objective lens, the modified areas in the material are narrow regions of reduced refractive index along X direction and Z direction with mask 1 and mask 2 respectively.

Figure 2:
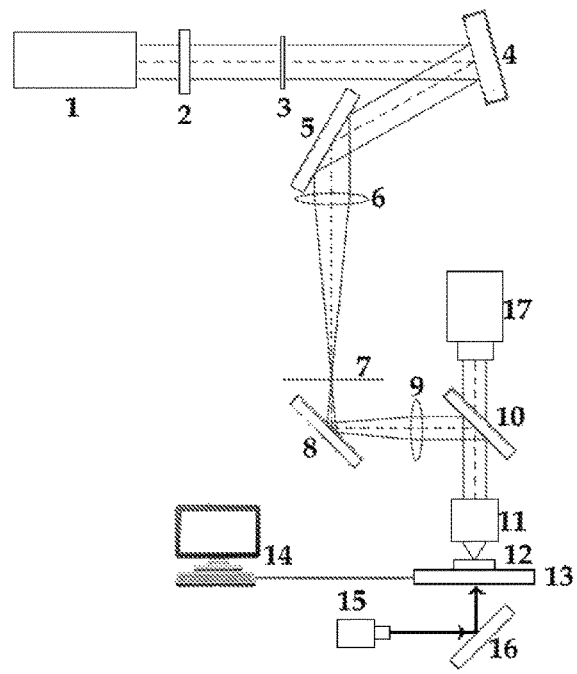
FIG. 2 shows a schematic arrangement of an embodiment of the apparatus of the present invention.

FIG. 2 is a schematic setup for the tubular waveguide fabrication. The output beam of a femtosecond laser 1 with an operation wavelength of 800 nm, a pulse width of ~40 fs, and a repetition rate of 1 kHz. The pulse energy is controlled by the attenuator 2, and the shutter 3 is used for blocking the laser pulses. The SLM 4 reflects the laser pulses, and the laser pulses are then reflected by the first reflecting mirror 5 and pass through a 4 f imaging system formed by the first convex lens 6, the second reflective lens 8, and the second convex lens 9, and then reflected by the dichroic mirror 10. The focal length of the first convex lens 6 and the second convex lens 9 are both 70 cm. In the focal plane of the first convex lens 6, which is also the Fourier imaging plane of the reflection spot by the spatial light modulator 4, a slit 7 is placed to have a spatial filtering to obtain a first diffraction spot. After the phase modulation and spatial filtering, the femtosecond laser pulses pass through the microscope objective lens 11 having a NA of 0.8 and are focused onto the inside of the ZBLAN glass material 12. The ZBLAN glass material 12 has a size of 10×7×3 mm, is placed on the platform 13, and the platform 13 is controlled by the computer 14. The cold light source 15 emits light that reaches the bottom of the ZBLAN glass material 12, the light transmitted is then focused through the microscope objective lens 11, and passing through the dichroic mirror 10, is received by the CCD 17. The image received by the CCD 17 is output to computer 14 for real-time view of the entire process.

After the optical path is arranged, attenuator 2 is used to adjust the laser incident power to 60 mW. FIG. 1(a) shows the image of the phase modulation input mask that is input into the spatial light modulator 4. Adjusting the height of the three-dimensional platform 13 so that the spot is focused to a position that is 50 μm from the upper surface inside the ZBLAN glass material 12. Subsequently, the optical waveguide cladding ring is obtained through the following four-step operation.

1. The opposite direction to the direction of the laser transmission is the z direction, The width and length of the ZBLAN glass material 12 are the x and y directions. The current position of a platform is set as the original start point for the movement of the platform. Open the shutter 3, using computer 14 to control and move platform 13 along the −y direction, moving speed is 20 μm/s, moving distance is 7 mm, and a cladding having a length of 7 mm, a width of 9.7 μm and relatively small refractive index is formed. Closing the shutter 3, moving the platform back to the original start point, and processing the layered structure with reduced refractive index as the bottom wall of the annular wall waveguide cladding.

2. The image of the phase modulation mask as shown in FIG. 1(b) is loaded onto the spatial light modulator 4. The three-dimensional platform 13 is driven back to the original start position, and then adjusted to move to the −z direction for 4 μm and to the x direction for 6 μm. Open the shutter 3, control the attenuator 2 to adjust the laser power to 20 mW, and control the three-dimensional platform 13 to move along −y direction, while maintaining the speed and distance unchanged. When the processing is complete, shutter 3 is closed and the platform 13 returns back to the start point. The left side wall of the annular waveguide cladding is obtained.

3. The platform 13 is driven back to the start position and then adjusted to move along the −z direction for 4 μm and along the −x direction for 6 μm. Open the shutter 3 and control the three-dimensional platform 13 to move along the −y direction, while maintaining the speed and distance. At the end of the processing, the shutter 3 is closed and the platform 13 moves back to the start point. The right side wall of the annular waveguide cladding is obtained.

4. The image of the phase modulation mask as shown in FIG. 1(a) is loaded onto the spatial light modulator 4. The platform 13 is driven back to the start position and then adjusted to move along the +z direction for 9.7 μm. Open the shutter 3 and attenuator 2 to adjust the power of the laser to 60 mW. Then, control the three-dimensional platform 13 to move along the −y direction, while maintaining the speed and distance. At the end of the processing, the shutter 3 is closed and the platform 13 moves back to the start point. The upper wall of the annular waveguide cladding is obtained.

After the above described four scanning, the femtosecond laser pulses interact with the ZBLAN glass material 13 to form the optical waveguide cladding. The cladding forms a rectangular cladding glass material which is the core of the optical waveguide. The annular waveguide formed at the end has a length of 7 mm, and the size of the mode field is about 9.7×9.7 μm.

Experimental results show that the present invention may induce the formation of low-loss tunable annular optical waveguide in a particular transparent material within certain mode field size range. Optical waveguides having the size of 9.7×9.7 μm and 20×20 μm are obtained. In the optical waveguide having a mode field of 9.7×9.7 μm, the loss measurements value is 0.5 dB/cm; the laser emitted by the helium-neon laser system is coupled to one end of the optical waveguide, and a bright and uniform light spot may be obtained from the other end. In addition, based on the above described technology and principle, an optical waveguide with any length may be realized. The experimental processing for making the optical waveguide having the length of 7 mm takes 18 minutes, thus, the process has high processing efficiency.

We claim:

1. A method for fabricating a tubular optical waveguide in a glass material, comprising
(1) inputting a first phase modulation mask into a spatial light modulator (SLM), wherein the SLM has liquid crystal surface with changeable refractive index, and the first phase modulation mask is a central rectangular grating region having a vertical length that is larger than a horizontal length thereof, whereby the SLM modulates phase of incoming femtosecond laser pulses to generate a relatively narrow beam;
(2) Fixing a transparent glass material on a plane of a computer-controlled XYZ platform and adjusting position of the transparent glass material by moving the computer-controlled XYZ platform;
(3) Passing femtosecond laser pulses emitted by a femtosecond laser system sequentially through an attenuator, a shutter, and the SLM on an optical pathway, wherein the femtosecond laser pulses are modulated by the SLM;
passing the modulated femtosecond laser pulses sequentially through a first reflector, a first convex lens, a slit, a second reflector, a second convex lens, and a dichroic mirror along the optical pathway, wherein the slit is positioned at a focal plane of the first reflector that is also a Fourier imaging plane of a reflection spot from the SLM, and the modulated femtosecond laser pulses is spatially filtered by the slit;
focusing the modulated and filtered femtosecond laser pulses by an objective lens on the optical pathway into inside of the transparent glass material, after being reflected by the dichroic mirror;
setting an opposite direction to the direction of the femtosecond laser pulses that are focused by the objective lens into the transparent glass material as a Z axis, setting a direction along a width of the transparent glass material on the plane of the computer-controlled XYZ platform as an X axis, and setting a direction along a length of the transparent glass material on the plane of the computer-controlled XYZ platform as a Y axis, after phase modulation by the SLM and spatially filtered by the slit, the modulated and filtered femtosecond laser pulses are focused into the transparent glass material fixed on the computer-controlled XYZ platform at a starting position through the objective lens to form a first narrow region with a width of D along the X axis and reduced refractive index;
moving the computer-controlled XYZ platform along the −Y direction for a distance L and focusing the modulated and filtered femtosecond laser pules into the transparent glass material to form a first flat and narrow region with a length of L and width of D inside the transparent glass material, wherein the first flat and narrow region has a refractive index that is less than a reflective index of the transparent glass material and is a bottom cladding of a waveguide;
(4) loading a second phase modulation mask into the SLM, wherein the second phase modulation mask is a central rectangular grating region having a horizontal length that is larger than a vertical length thereof, and whereby the SLM modulates to generate a relatively wide beam;
(5) adjusting power of the femtosecond laser pulses by the attenuator, returning the computer-controlled XYZ platform to the starting position and moving the computer-controlled XYZ platform for a first distance along the X direction and a second distance along the −Z direction to adjust position of the transparent glass material so that, after phase modulation by the SLM and spatially filtered by the slit, the modulated and filtered femtosecond laser pulses are focused into the inside of the transparent glass material and form a second narrow region along Z direction with a width of D, wherein the second narrow region is connected to the left side of the first flat and narrow region; moving the computer-controlled XYZ platform along the −Y direction for a distance of L to form a second planar laser-modified region with reduced refractive index that is a left cladding of the waveguide;

(6) returning the computer-controlled XYZ platform to the starting position and moving the computer-controlled XYZ platform for the first distance to the −X direction and the second distance to the −Z direction to adjust position of the transparent glass material so that, after phase modulation by the SLM and spatially filtered by the slit, the modulated and filtered femtosecond laser pulses are focused into the transparent glass material and form a third narrow region along Z direction with a width of D, wherein the third narrow region is connected to the right side of the first flat and narrow region; moving the computer-controlled XYZ platform along the −Y direction for a distance of L to form a third planar laser-modified region with reduced refractive index that is a right cladding of the waveguide; and (7) moving the computer-controlled XYZ platform back to the starting position, reloading the first phase modulation mask into the SLM, moving the computer-controlled XYZ platform for a distance D along −Z direction, adjusting power of the femtosecond laser pulses by the attenuator and the modulated and filtered femtosecond laser pulses, after phase modulation by the SLM and spatially filtered by the slit, are focused into the transparent glass material to form a fourth narrow region inside the transparent glass material that is parallel to the plane of the first flat and narrow region; moving the computer-controlled XYZ platform for a distance of L along −Y direction to form a fourth planar laser-modified region with reduced refractive index that is a top cladding of the waveguide, wherein the bottom, left, right, and top claddings enclose a channel as the waveguide, and cross-section of the channel is square-shaped.

2. The method of claim 1, wherein the central rectangular grating region of the first phase modulation mask has a vertical length of 12000 μm, and a horizontal length of 120 μm.

3. The method of claim 1, wherein the central rectangular grating region of the second phase modulation mask has a vertical length of 800 μm, and a horizontal length of 16000 μm.

* * * * *